(12) United States Patent
Gintis et al.

(10) Patent No.: US 8,614,955 B2
(45) Date of Patent: Dec. 24, 2013

(54) MISDIRECTED PACKET DETECTION APPARATUS AND METHOD

(75) Inventors: Noah Gintis, Westlake Village, CA (US); Alok K. Srivastava, Woodland Hills, CA (US); Victor Alston, Oak Park, CA (US)

(73) Assignee: Ixia, Calabasas, CA (US)

( * ) Notice: Subject to any disclaimer, the term of this patent is extended or adjusted under 35 U.S.C. 154(b) by 614 days.

(21) Appl. No.: 12/564,838

(22) Filed: Sep. 22, 2009

(65) Prior Publication Data
US 2011/0069620 A1    Mar. 24, 2011

(51) Int. Cl.
*G01R 31/08* (2006.01)

(52) U.S. Cl.
USPC ........... 370/242; 370/250; 370/251; 370/252; 709/223; 709/224

(58) Field of Classification Search
USPC ................. 370/242, 250, 251, 252; 709/224, 709/249
See application file for complete search history.

(56) References Cited

U.S. PATENT DOCUMENTS

| | | | |
|---|---|---|---|
| 5,802,073 A * | 9/1998 | Platt | 714/733 |
| 5,850,388 A | 12/1998 | Anderson et al. | |
| 6,233,256 B1 | 5/2001 | Dieterich et al. | |
| 6,321,264 B1 | 11/2001 | Fletcher | |
| 6,389,532 B1 * | 5/2002 | Gupta et al. | 713/163 |
| 6,678,246 B1 | 1/2004 | Smyth | |
| 6,717,917 B1 * | 4/2004 | Weissberger et al. | 370/252 |
| 7,134,143 B2 | 11/2006 | Stellenberg et al. | |
| 7,519,990 B1 * | 4/2009 | Xie | 726/13 |
| 7,760,732 B2 * | 7/2010 | Bhargava et al. | 370/392 |
| 2002/0013825 A1 * | 1/2002 | Freivald et al. | 709/218 |
| 2005/0086520 A1 * | 4/2005 | Dharmapurikar et al. | 713/201 |
| 2006/0088060 A1 | 4/2006 | Fujikami et al. | |
| 2006/0190594 A1 * | 8/2006 | Jorgenson et al. | 709/224 |
| 2007/0115833 A1 * | 5/2007 | Pepper et al. | 370/241 |
| 2007/0291654 A1 | 12/2007 | Pepper | |
| 2008/0112332 A1 | 5/2008 | Pepper | |
| 2008/0117907 A1 | 5/2008 | Hein | |
| 2010/0034100 A1 * | 2/2010 | Beyers | 370/250 |

FOREIGN PATENT DOCUMENTS

| | | |
|---|---|---|
| JP | 2007-201878 | 8/2007 |
| JP | 2008-131640 | 6/2008 |
| JP | 2010-262062 | 11/2010 |

OTHER PUBLICATIONS

Tanenbaum, Computer Networks 4th Edition, 2003, Prentice Hall PTR, USA, XP-002608609, pp. 536-239.

(Continued)

*Primary Examiner* — Awet Haile
(74) *Attorney, Agent, or Firm* — SoCal IP Law Group LLP; John E. Gunther; Steven C. Sereboff

(57) ABSTRACT

There are disclosed methods and a packet receiver for testing a network. A packet may be received from the network at a port unit. The port unit may ignore the received packet if the received packet does not contain a valid test signature. When the received packet contains a valid test signature, the port unit may determine if the port unit is an expected destination for the received packet. When the port unit is not an expected destination for the received packet, a misdirected packet counter may be incremented. When the port unit is an expected destination for the received packet, test data may be extracted from the received packet.

15 Claims, 10 Drawing Sheets

(56) References Cited

OTHER PUBLICATIONS

European Patent Office, European Search Report and Written Opinion for European Application No. 10 009 966.2, Mail Date Nov. 18, 2010, pp. 1-9.

Ixia, The Ixia 200 Traffic Generator and Analyzer, Product Description, 1997-1999.

Japan Patent Office, Notice of Reasons for Rejection for Japanese Application No. 2010-196427, mail date Dec. 13, 2011.

* cited by examiner

| Destination | Ports | ICPG | Destination Signature (X indicates bit is not used) | |
|---|---|---|---|---|
| | | | Group Code | PE |
| D1 | 0 | | 001 | X01 |
| D2 | 1 | 01 | 001 | X10 |
| D3 | 0,1 | | 001 | X11 ┬── Port 0 enable |
| | | | | └── Port 1 enable |
| D4 | 2 | Unicast | 000 | 000 ── Unique number within unicast group |
| D5 | 3 | Unicast | 000 | 001 ── Unique number within unicast group |
| D6 | 4 | 45 | 010 | XX0 |
| D7 | 4,5 | | 010 | XX1 └── Port 5 enable |
| D8 | 6 | | 011 | X01 |
| D9 | 6,7,8 | 678 | 011 | X11 |
| D10 | 7,8 | | 011 | X10 ┬── Port 6 enable |
| | | | | └── Port 7/8 enable |
| D11 | 9,A | 9AB | 100 | X01 |
| D12 | A,B | | 100 | X10 |
| D13 | C | | 101 | 001 |
| D14 | C,D | CDE | 101 | 011 |
| D15 | C,E | | 101 | 101 |
| D16 | D | | 101 | 010 |
| D17 | F | Unicast | 000 | 010 ── Unique number within unicast group |

FIG. 7A

| Destination | Ports | ICPG | Group Code | PE | Destination Signature (X indicates bit is not used) |
|---|---|---|---|---|---|
| D1 | 0 | 01 | 001 | X01 | |
| D2 | 1 | 01 | 001 | X10 | |
| D3 | 0,1 | 01 | 001 | X11 | |
| D4 | 2 | Unicast | 000 | 000 | — Unique number within unicast group |
| D5 | 3 | Unicast | 000 | 001 | — Unique number within unicast group |
| D6 | 4 | 45 | 010 | XX0 | |
| D7 | 4,5 | 45 | 010 | XX1 | |
| D8 | 6 | 678 | 011 | X01 | |
| D9 | 6,7,8 | 678 | 011 | X11 | |
| D10 | 7,8 | 678 | 011 | X10 | |
| D11 | 9,A | 9AB | 100 | X01 | ⎫ Port 9 enable |
| D12 | A,B | 9AB | 100 | X10 | ⎭ Port B enable |
| D13 | C | CDE | 101 | 001 | ⎫ Port C enable |
| D14 | C,D | CDE | 101 | 011 | ⎪ Port D enable |
| D15 | C,E | CDE | 101 | 101 | ⎭ Port E enable |
| D16 | D | CDE | 101 | 010 | |
| D17 | F | Unicast | 000 | 010 | — Unique number within unicast group |

FIG. 7B

| Port | Port filter 860 |
|---|---|
| 0 | 001 XX1 |
| 1 | 001 X1X |
| 2 | 000 000 |
| 3 | 000 001 |
| 4 | 010 XXX |
| 5 | 010 XX1 |
| 6 | 011 XX1 |
| 7 | 011 X1X |
| 8 | 011 X1X |
| 9 | 100 XX1 |
| A | 100 XXX |
| B | 100 X1X |
| C | 101 XX1 |
| D | 101 X1X |
| E | 101 1XX |
| F | 000 010 |

X indicates bit is "don't care"

FIG. 8

MISDIRECTED PACKET DETECTION APPARATUS AND METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating and receiving traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. The received test traffic may be analyzed to measure the performance of the network. Each port connected to the network may be both a source of test traffic and a destination for test traffic. Each port may emulate a plurality of logical source or destination addresses. The number of ports and the communications paths that connect the ports to the network are typically fixed for the duration of a test session. The internal structure of the network may change during a test session, for example due to failure of a communications path or hardware device.

Each packet in the test traffic may be a unicast packet intended for reception at a specific destination port or a multicast packet, which may be intended for reception at two or more destination ports. However, packets may be misdirected by the network. A misdirected packet may be received at one or more ports that are not intended destinations.

A series of packets originating from a single port and having a specific type of packet and a specific rate will be referred to herein as a "stream." A source port may support multiple outgoing streams simultaneously and concurrently, for example to accommodate multiple packet types, rates, or destinations. "Simultaneously" means "at exactly the same time." "Concurrently" means "within the same time."

For the purpose of reporting network traffic data, the packets within a stream may be organized into flows, where a "flow" is any plurality of packets for which network traffic statistics are accumulated and reported. The packets in a given flow may be distinguished by a flow identifier contained in each packet. The flow identifier may be, for example, a dedicated identifier field, an address, a port number, a tag, or some other field or combination of fields within each data unit.

A plurality of concurrent streams may be combined to form the output from a source port, which will be referred to herein as "test traffic". The streams within the test traffic may be transmitted sequentially or concurrently through interleaving. The interleaving may be balanced, unbalanced, and distributed among the represented streams. To test a modern "triple play" network and network equipment, the test traffic may contain simulated data, audio, and video streams.

DESCRIPTION OF THE DRAWINGS

FIG. 7A and FIG. 7B are, in combination, a table illustrating the assignment of destination signatures to the destinations list in FIG. 6A.

FIG. 8 is a table listing the port filters for the destination signatures of FIG. 7A and FIG. 7B.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 4, 8, 16, 32, 64, or more parallel connections.

DETAILED DESCRIPTION

Description of Apparatus

Figure 1:
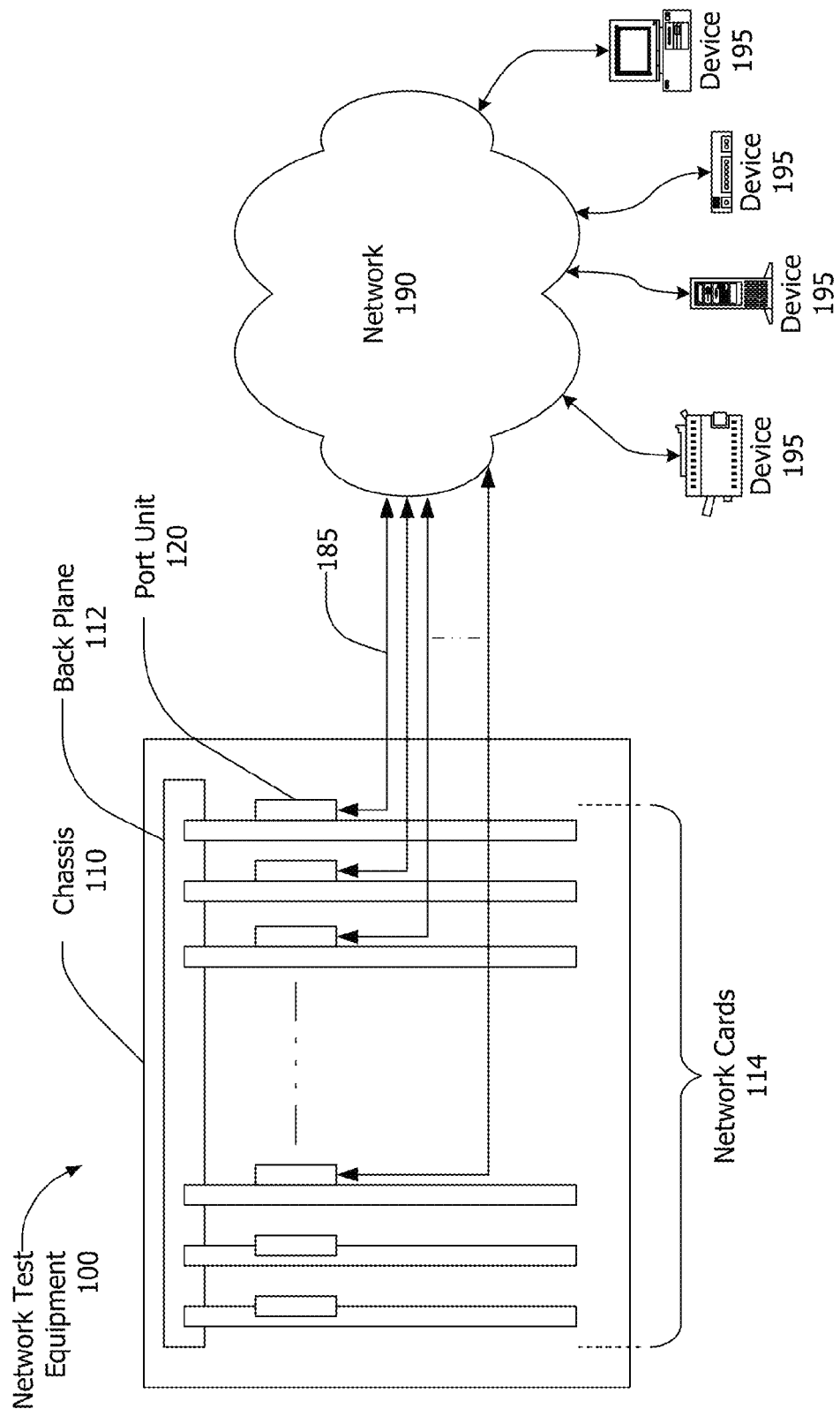
FIG. 1 is a block diagram of a network environment.

FIG. 1 shows a block diagram of a network environment. The environment may include network test equipment 100, a network 190 and plural network devices 195.

The network test equipment 100 may be a network testing device, performance analyzer, conformance validation system, network analyzer, or network management system. The network test equipment 100 may include one or more network cards 114 and a backplane 112 contained or enclosed within a chassis 110. The chassis 110 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 114 may support one or more well known standards or protocols such as the various Ethernet and Fibre Channel standards, and may support proprietary protocols as well.

The network cards 114 may include one or more field programmable gate arrays (FPGAs), application specific integrated circuits (ASICs), programmable logic devices (PLDs), programmable logic arrays (PLAs), processors and other kinds of devices. In addition, the network cards 114 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 114 may support a single communications protocol, may support a number of related protocols, or may support a number of unrelated protocols. The network cards 114 may be permanently installed in the network test equipment 100 or may be removable.

Each network card 114 may contain one or more port unit 120. One port unit or a plurality of port units may connect to the network 190 through respective ports. Each port may be connected to the network through a respective communication medium 185, which may be a wire, an optical fiber, a wireless link, or other communication medium. The communications media connecting the network to a plurality of ports may be the same or different. Each port unit 120 may generate and transmit test traffic to the network, and each port unit 120 may receive test traffic from the network. Packets transmitted by one of the port units 120 may commonly be received by one or more other port units.

The backplane 112 may serve as a bus or communications medium for the network cards 114. The backplane 112 may also provide power to the network cards 114.

The network devices 195 may be any devices capable of communicating over the network 190. The network devices 195 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 195 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 195 may communicate simultaneously with one another, and there may be plural logical communications paths between the network test equipment 100 and a given network device 195. The network itself may be comprised of numerous nodes providing numerous physical and logical paths for data to travel.

Figure 2:
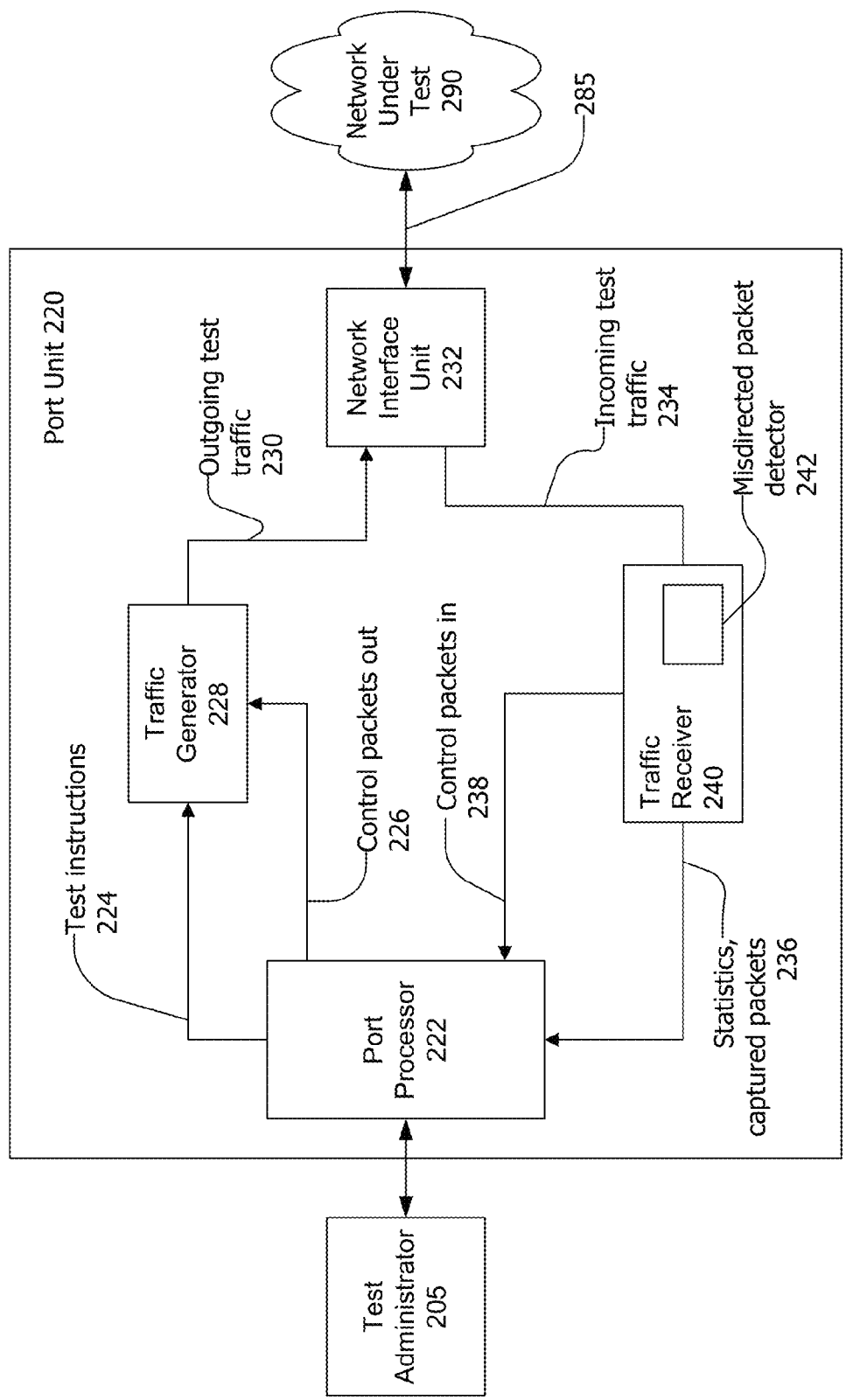
FIG. 2 is a block diagram of a port unit.

Referring now to FIG. 2, an exemplary port unit 220 may include a port processor 222, a traffic generator 228, a traffic receiver 240, and a network interface unit 232 which couples the port unit 220 to a network under test 290. The port unit 220 may be all or part of a network card such as the network cards 114.

The port processor 222 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port processor 222 may communicate with a test administrator 205. The test administrator 205 may be a computing device contained within, or external to, the network test equipment 100. The test administrator 205 may provide the port processor with instructions and data required for the port unit to participate in testing the network 290. The instructions and data received from the test administrator 205 may include, for example, definitions of packet streams to be generated by the port unit 220 and definitions of performance statistics that may be accumulated and reported by the port unit 220.

The port processor 222 may provide the traffic generator 228 with test instructions 224. The test instructions 224 may cause the traffic generator 228 to form a plurality of streams that may be interleaved to form outgoing test traffic 230. The traffic generator 228 may then generate the plurality of streams in accordance with the test instructions 224. Each of the streams may include a sequence of packets. The test instructions 224 may include, for example, the type of packet, the frequency of transmission, definitions of fixed and variable-content fields within the packet and other information for each packet stream.

The network interface unit 232 may convert the outgoing test traffic 230 from the traffic generator 228 into the electrical, optical, or wireless signal format required to transmit the test traffic to the network under test 290 via a link 285, which may be a wire, an optical fiber, a wireless link, or other communications link. Similarly, the network interface unit 232 may receive electrical, optical, or wireless signals from the network over the link 285 and may convert the received signals into incoming test traffic 234 in a format usable to the traffic receiver 240.

The traffic receiver 240 may receive the incoming test traffic 234 from the network interface unit 232. The traffic receiver 240 may include a misdirected packet detector 242 to determine if each received packet is associated with the test in progress and has been received at an intended destination. The misdirected packet detector 242 may maintain a cumulative count of received packets that were misdirected, or received at an unintended destination. When a received packet is determined to be at a correct destination, the traffic receiver 240 may identify the received packet as a member of a specific flow, and may accumulate test statistics for each flow. The accumulated test statistics may include, for example, a total number of received packets, a number of packets received out-of-sequence, a number of received packets with errors, a maximum, average, and minimum propagation delay, and other statistics for each flow. The traffic receiver 240 may also capture and store specific packets in accordance with capture criteria provided by the port processor 222. The traffic receiver 240 may provide test statistics and/or captured packets 236 to the port processor 222, for additional analysis during, or subsequent to, the test session.

The outgoing test traffic 230 and the incoming test traffic 234 may be primarily stateless, which is to say that the outgoing test traffic 230 may be generated without expectation of any response and the incoming test traffic 234 may be received without any intention of responding. However, some amount of stateful, or interactive, communications may be required or desired between the port unit 220 and the network 290 during a test session. For example, the traffic receiver 240 may receive control packets, which are packets containing data necessary to control the test session, that require the port unit to send an acknowledgement or response.

The traffic receiver 240 may separate incoming control packets from the incoming test traffic and may route the incoming control packets 234 to the port processor 222. The port processor 222 may extract the content of each control packet and may generate an appropriate response in the form of one or more outgoing control packets 226. Outgoing control packets 226 may be provided to the traffic generator 228. The traffic generator 228 may insert the outgoing control packets into the outgoing test traffic 230.

Figure 3:
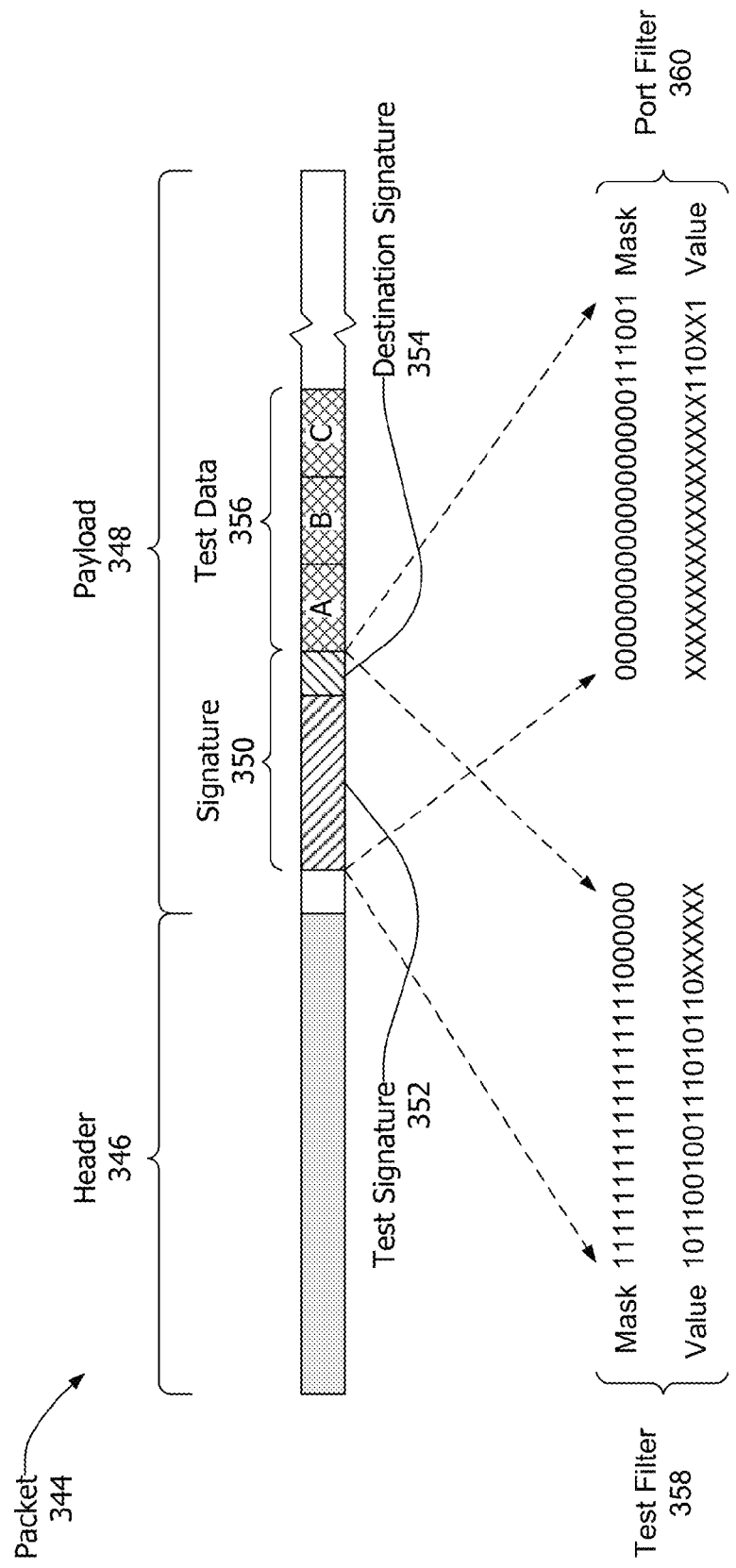
FIG. 3 is a graphical representation of a packet.

Referring now to FIG. 3, a representative packet 344 may include a header 346 and a payload 348. The header 346 may include a plurality of cascaded headers corresponding to sequential communications protocol layers. For example, the header 346 may include a layer two header, such as a Media Access Control header; a layer three header, such as an Internet Protocol header; and a layer four header, such as a Transmission Control Protocol or User Datagram Protocol header. In addition, the header 346 of the packet 344 may be changed during transmission through a network, for example by the addition or removal of Multiple Protocol Label Switching labels or tunneling protocol headers. Thus a substantial amount of processing may be required to parse and interpret the various fields within the header 346.

To allow a packet receiver to determine if a received packet is part of a test session, and to enable the packet receiver to extract test data from a received packet without parsing the header portion of the packet, the packet 344 may include a signature 350 and one or more test data fields 356. The signature 350 and the test data fields 356 may commonly be placed in the payload 348. A traffic receiver may locate the signature 350 within a received packet by performing a floating comparison or pattern match against the known value of the test signature. The traffic receiver may than locate and extract the test data 356 based on the known position of these field in relationship to the signature 350. The test data fields 356 may include, for example, a packet flow identifier (also called a packet group identifier), a sequence number within the identified packet flow, a time stamp, and other test information. As shown in FIG. 3, the test data fields 356 may simply follow immediately after the signature field 350. The test data fields 356 may be located elsewhere within the packet 344, offset from the signature 350 by known amounts. The use of a signature to validate test packets is further described in U.S. Pat. No. 6,717,917 B1 which is incorporated herein by reference. The use of a signature to locate test data within a packet is further described in published patent application US 2007/0115833 A1, which is incorporated herein by reference.

To enable a traffic receiver to determine if a received packet was misdirected, or received at an unintended location, the signature 350 may be partitioned into a test signature 352 and a destination signature 354. The test signature 352 may identify a received packet as a test packet associated with a particular test session. The test signature 352 may be common to all packets generated during the test session. The destination signature 354 may define which port or ports of a network test equipment, such as the network test equipment 100, are intended to receive each packet.

For ease of presentation, the signature 350 in the example of FIG. 3 is shown as 24 bits in length. In a real world situation, the signature 350 may be of significant length such that the probability of a non-test packet containing a bit string that duplicates the signature is negligible. The signature may be, for example, 8 bytes, 12 bytes or 16 bytes in length.

The test signature 352 may be detected within the packet 344 by performing a floating pattern match with a test filter 358. The test filter 358 may include an expected value for the test signature and a mask that defines how many bits of the signature 350 are used as the test signature 352. In this example, a logical "1" at a bit position in the mask indicates that the corresponding bit in the signature 350 is part of the test signature 352, and a logic "0" at a bit position in the mask indicates the corresponding bit in the signature 350 is not part of the test signature 352 and thus ignored. In this example, the test signature 352 is the left-hand 18 bits of the signature 350. The meaning of logical "1" and logical "0" in the mask may be reversed.

The packet 344 may be determined to be misdirected if the destination signature 354 does not match a port filter 360. The port filter 360 may include a value and a mask that defines how many bits of the signature 350 must match the value. In this example, a logical "1" at a bit position in the mask indicates that the corresponding bit in the signature 350 must match the corresponding bit of the value, and a logic "0" at a bit position in the mask indicates the corresponding bit in the signature 350 should be ignored. In this example, although the six right-hand bits of the signature 350 are available for use as the destination signature, two of the available six bits are ignored.

Figure 4:
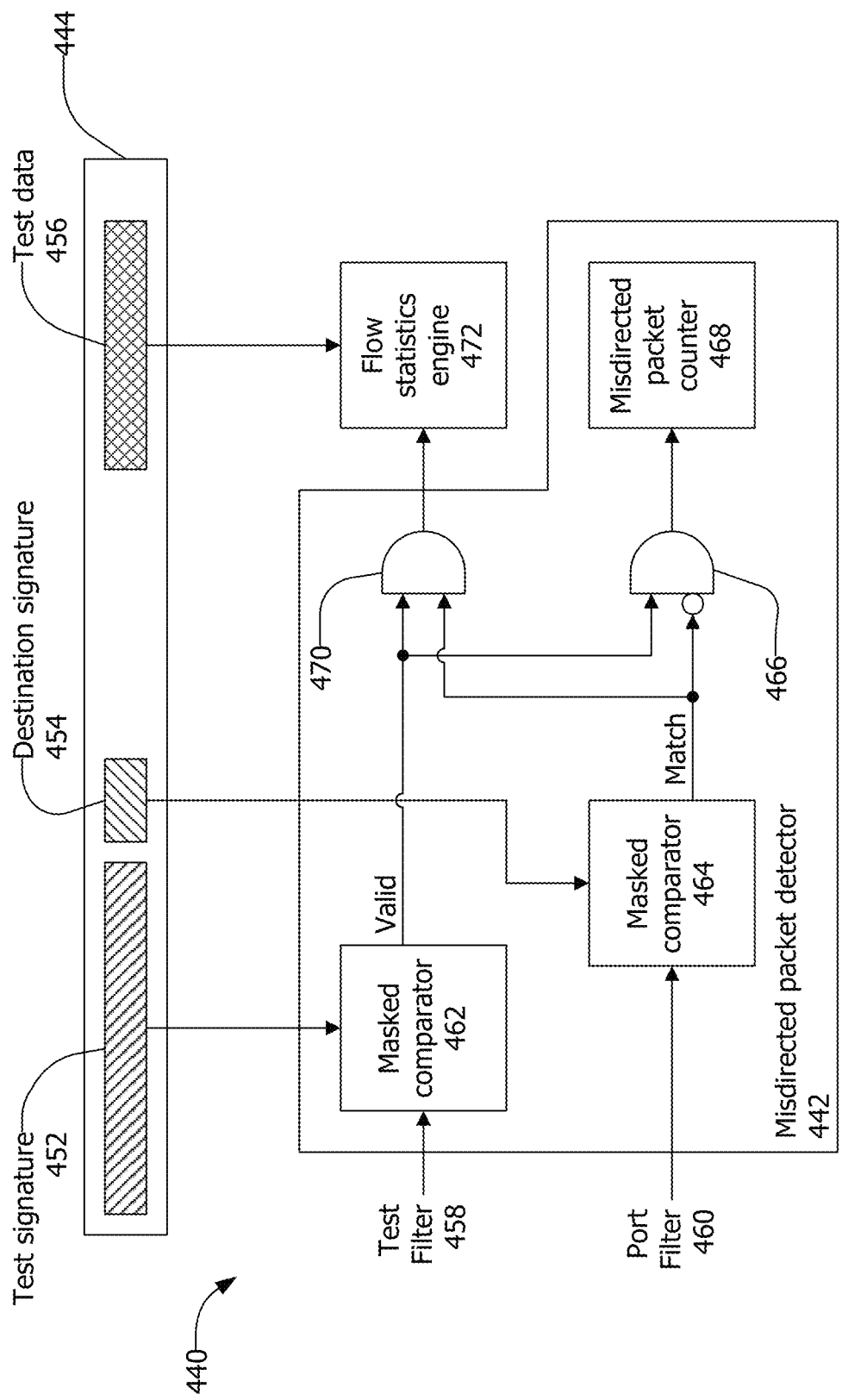
FIG. 4 is a block diagram of a misdirected packet detector.

Referring now to FIG. 4, a packet receiver 440, which may be the packet receiver 240, may include a misdirected packet detector 442 including a first masked comparator 462, a second masked comparator 464, and a misdirected packet counter 468. In this context, a "masked comparator" is a logic circuit that compares two binary numbers through a mask such that specific bit positions in each binary number are ignored or designated as "don't care".

The first masked comparator 462 may perform a floating pattern comparison between a received packet 444 and a test filter 458 to locate, if present, a test signature 452 with the received packet 444. When the received packet 444 does not contain a valid text signature 452, the received packet 444 may simply be discarded or ignored. When the received packet 444 contains a valid test signature 452, the second masked comparator 464 may compare a destination signature 454 extracted from the received packet 444 to a port filter 460. The contents and format of the test filter 458 and the port filter 460 may be similar, but substantially longer, than the test filter 358 and port filters 360. A match between the destination signature 452 and the port filter 460 indicates the received packet has been correctly received at an intended location.

When the received packet contains both a valid test signature 452 and a destination signature 454 which matches the port filter 460 (as indicated by AND gate 470) a flow statistics engine 466 may be enabled to extract test data 456 from the receive packet 444. The flow statistics engine may then accumulate test statistics based on the extracted test data. Test statistics may include, for example, cumulative information such as the total number of packets received for each flow and/or the total number of out-of-sequence packets received for each flow; temporal information such as the minimum, maximum, and/or average latency for each flow; and other information indicative of the performance of a network under test.

When the received packet contains a valid test signature 452 but the destination signature 454 does not match the port filter 460 (as indicated by AND gate 466), the received packet 444 belongs to the test session in progress but has been misdirected and received at an unintended destination. In this case, the misdirected packet counter 468, which may be set to zero at the start of a test session, may be incremented to indicate a cumulative total number of misdirected packets received at the traffic receiver 440.

Description of Processes

Figure 5:
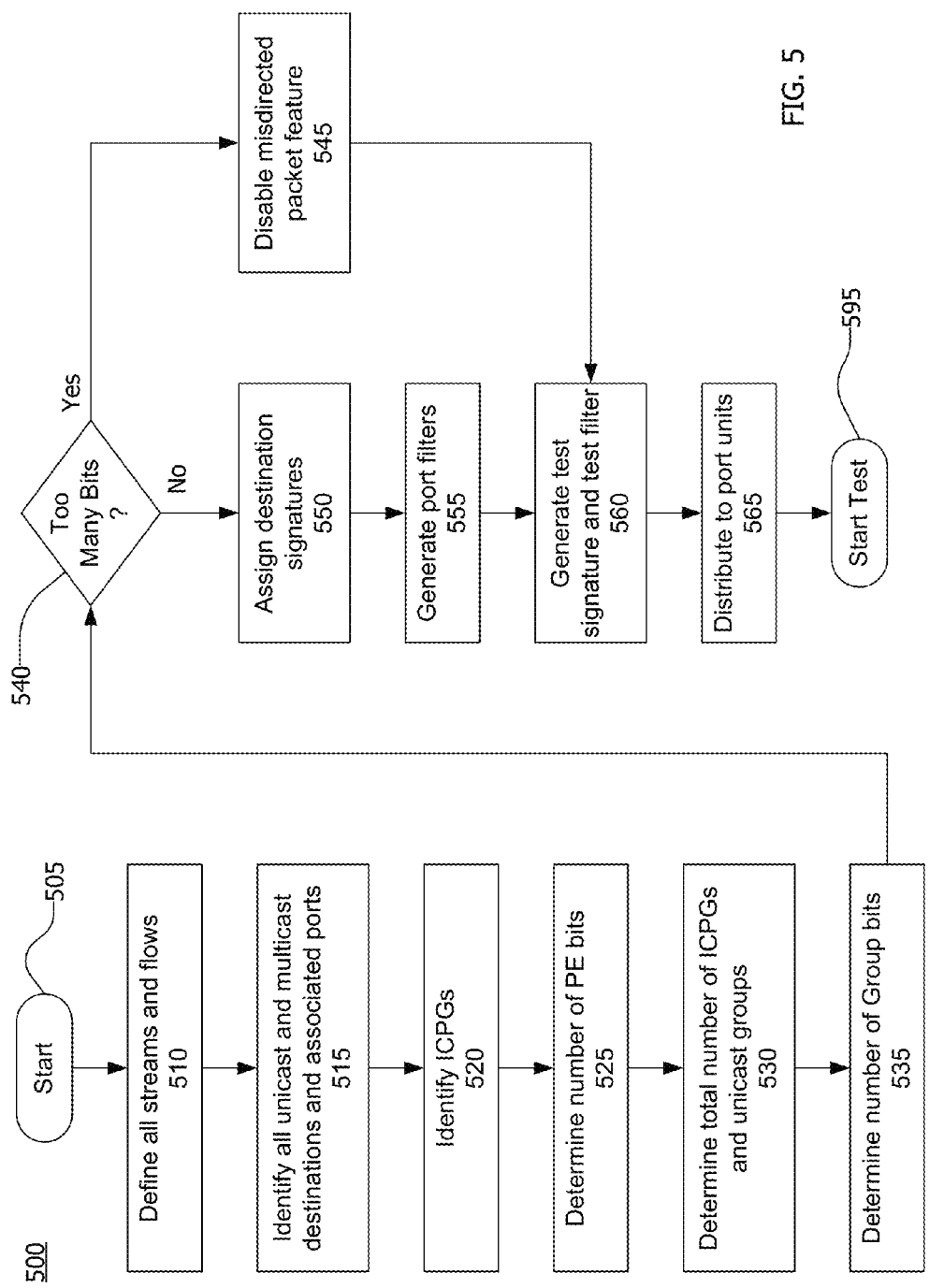
FIG. 5 is a flow chart of a process for designing a test session.

Referring now to FIG. 5, a process 500 for designing a test session may start at 505 and end at 595 when the test commences. At 510, all of the packet streams and flows that will be generated, transmitted, received, and analyzed during the test may be defined. In some cases, such as a test of a single item of network equipment or a test to measure a small number of performance parameters, the packet streams and flows may be defined by a test engineer. In more complex tests, the streams and flows may be defined, at least in part, automatically by a test system in response to test parameters and requirements entered by the test engineer. For example, the test engineer may specify the total number of packets to be transmitted to the network at each port, a desired traffic mix, a transmission rate or loading at some or all of the ports, and/or other test parameters. The test system may then define a plurality of streams and flows that satisfy the requirements set by the test engineer.

At 515, the stream and flow definitions from 510 may be analyzed to identify all of the destinations that will receive packets, and the test equipment port or ports associated with each destination. In this context, a "destination" may be either a port that receives unicast packets or a group of ports that receives the same multicast packets. Each destination may receive one or many streams and flows of packets from one or more sources.

Figures 6A, 6B:
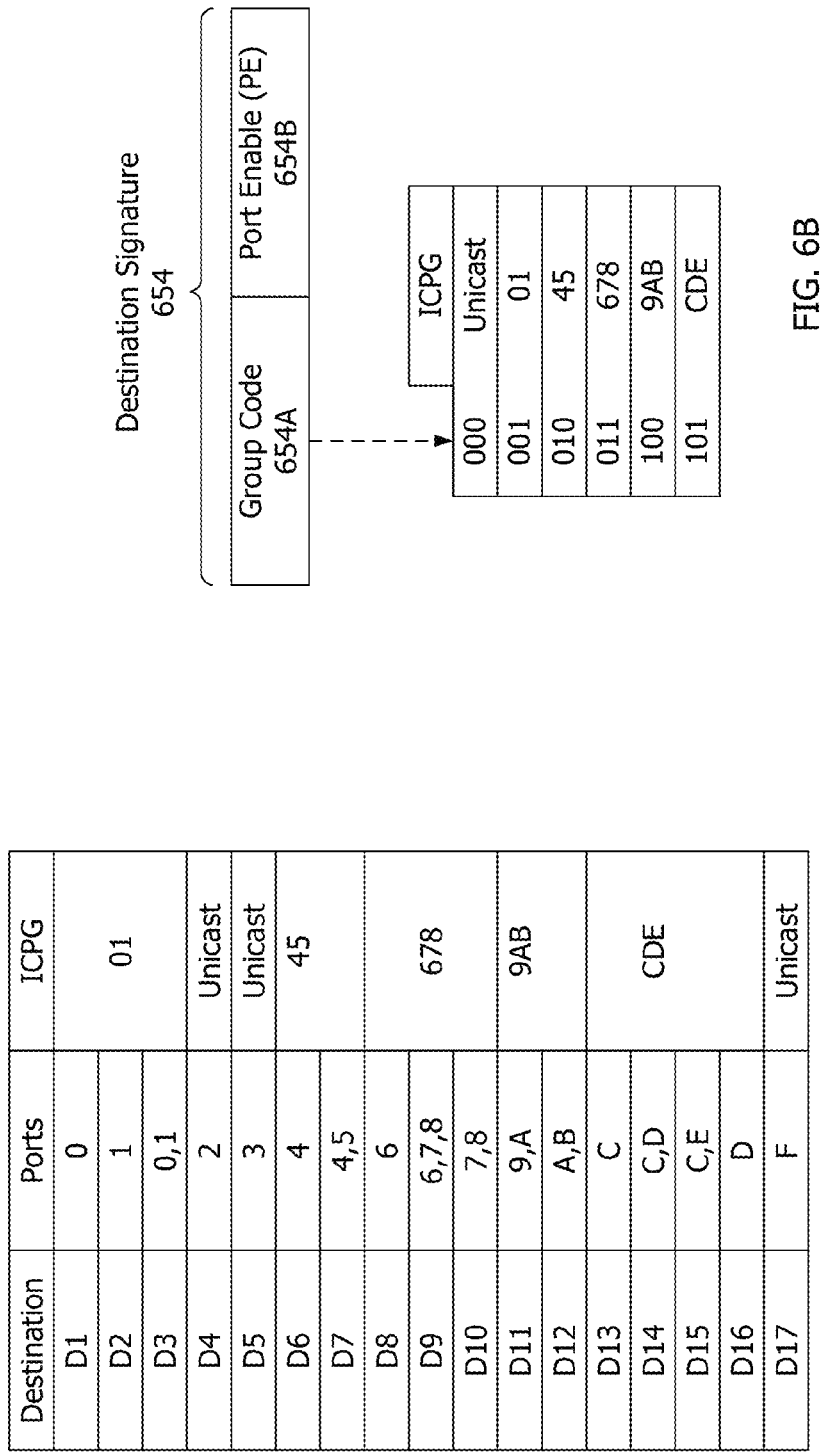
FIG. 6A is an exemplary destination list.
FIG. 6B is a graphic representation of a signature field within a packet.

At 520, the identified destinations may be sorted or otherwise processed to identify interconnected port groups (ICPGs), where an ICPG includes all ports that receive multicast packets with any other member of the group. Conversely, the ports within an ICPG do not receive multicast packets with any other port that is not a member of the ICPG. An exemplary destination list, sorted into ICPGs, is shown in FIG. 6A. In this example, a network test equipment receives packets at 16 ports, identified in FIG. 6A by hexadecimal numbers 0 through F. The test session transmits packets to a total of seventeen destinations, identified as D1 through D17. For example, D1 is the destination of all unicast packets (from any source and of any type) to be received at Port 0. Similarly, D9 is the destination of all packets to be received at a multicast group consisting of Ports 6, 7, and 8.

Form FIG. 6A, it can be seen that Ports 0, 1, 2, 3, 4, 6, C, D, and F receive unicast packets. Of these, Ports 2, 3, and F receive only unicast packets, and Ports 0, 1, 4, 6, C, and D receive both unicast and multicast packets. Ports 5, 7, 8, 9, A, and B only receive packets that are multicast to at least one other port.

Destination D3 is a multicast group consisting of Ports 0 and 1. Since Ports 0 and 1 are not members of any other multicast group, Ports 0 and 1 constitute a first ICPG which is simply labeled by the port numbers 01. ICPG 01 also corresponds to destinations D1, D2, and D3. Any packet addressed to destinations D1, D2, or D3 is intended to be received at one or more ports within ICPG 01 and should not be received by any port that is not a member of ICPG 01. Similarly, Ports 4 and 5 and constitute ICPG 45 corresponding to destinations D6 and D7; Ports 6, 7, and 8 constitute ICPG 678 corresponding to destinations D8, D9, and D10; RX Ports 9, A, and B constitute ICPG 9AB corresponding to destinations D11 and D12; and Ports C, D, and E constitute ICPG CDE corresponding to destinations D13-D16. In the example of FIG. 6A, a total of 17 destinations can be organized into five ICPGs plus three unicast-only destinations (D4, D5, D17) which can be considered to constitute a unicast port group.

The list of destinations shown in FIG. 6A is exemplary, and a tabular list as shown in FIG. 6A may not actually be created for each test session. Rather the destinations and ICPGs may be identified automatically using known techniques for manipulating disjoint-set data structures. For example, each receiving port unit may be represented by a node and each multicast group may be represented by edges or paths connecting the associated port units. The combination of nodes and paths form a so-called disjoint-tree data forest, where each isolated node represents a port that only receives unicast packets, and each tree data set represents the ports within an ICPG.

Referring now to FIG. 6B, a destination signature 654 may be assigned to each destination. The assigned destination signature may be embedded within each packet sent to the corresponding destination. The destination signature 654 may include a Group Code 654A that identifies an ICPG or unicast group including the port or ports that receive packets sent to the respective destination. The destination signature 654 may further include Port Enable (PE) bits 654B that indicate which specific ports within the ICPG identified by the Group Code 654A are intended to receive packets send to the respective destination.

Returning to FIG. 5, once the ICPGs and unicast destinations have been identified at 520, the number of PE bits required to identify which specific ports within each ICPG are intended to receive packets may be determined. When a destination includes multiple ports forming a multicast group, the Group Code 654A of the corresponding destination signature 654 may identify the ICPG containing all of the ports in the multicast group, plus all other interconnected ports. In this case, each PE bit 654B may indicate that a corresponding Port within the ICPG is or is not intended to receive packets send to the destination. Each PE bit may correspond to a single port, such that the maximum number of PE bits required may be equal to the number of ports within the largest ICPG (the ICPG that contains the most ports). In some situations, examples of which will be discussed subsequently, the number of PE bits may be less than the number of ports in the largest ICPG.

At 530, the total number of ICPGs and unicast groups may be determined. The number of ICPGs may be known from 520, and the number of unicast groups may be determined based on the number of unicast ports identified at 520 and the number of PE bits allocated at 525. When a destination includes a single port that only receives unicast packets, the Group Code 654A of the corresponding destination signature 654 may identify a unicast group containing the port, and the PE bits may identify a specific port within the unicast group. The maximum number of ports within a unicast group may be determined by the available number of PE bits, as determined at 525. In the example of FIG. 6A, the largest ICPGs contain only three ports. Thus the destination signatures assigned to the destinations defined in FIG. 6A may contain three PE bits. Each unicast group may include up to eight unicast ports (only three unicast ports are defined in FIG. 6A), each of which may be designated by one of eight possible distinct 3-bit PE values.

At 535, the number of bits required for the group code 654A may be determined based on the total number of ICPGs and unicast groups from 530. The example of FIG. 6A included 17 destinations that may be organized at 520, 525, and 530 into five ICPGs and one unicast group. Continuing this example, these six groups can be unambiguously identified using a three-bit group code 654A. A unique three-bit value may be assigned to each of the six groups. FIG. 6B includes an example of group codes assigned to the six ICPGs defined in FIG. 6A. The group codes may be assign arbitrarily so long as each group receives a unique group code.

At 540, a determination may be made if the length of the destination signature, which is the combined length of the group code and PE bits, exceeds a predetermined maximum number of bits. As an extreme example, a test session that involved 256 receive ports and used numerous and extensive multicast addressing may have only a single ICPG. In this case, the destination signatures may require 256 PE bits. A 256-bit destination signature may consume the entire payload of short packets and may require extensive dedicated hardware within each traffic receiver and thus be impractical. The predetermined maximum number of bits for the destination signature may be 24 bits or 32 bits or 64 bits or some other value.

In the case where the destination signature is determined to be too long at 540, the misdirected packet detection feature may be disabled at 545 and the process 500 may continue at 560. Disabling the misdirected packet detection feature at 545 may include notifying the test engineer or other operator that the misdirected packet detection feature is not available for the streams and flows as defined at 510. Disabling the misdirected packet detection feature at 545 may also include setting a flag at, or sending a message to, each port unit indicating that misdirected packet detection will not be used. The misdirected packet detection feature may also be disabled at 545 by setting all bits of the port filters for all receive ports to "don't care". When all bits of the port filters are "don't care, every packet will automatically match the port filter at the receiving traffic receiver. Thus each traffic receiver will never determine that a received packet is misdirected.

When the length of the required destination signature is determined to be acceptable at 540, unique destination signatures may be assigned to each destination and corresponding port filters may be generated at 550. A port filter may be generated at 550 for each port that will receive packets during the test session. FIG. 7A, FIG. 7B, and FIG. 8 continue the example of FIG. 6A. FIG. 7A, FIG. 7B provide an example of destination signatures assigned to the 17 destinations D1-D17 defined in FIG. 6A. The destination signature for each destination is composed of a 3-bit group code and 3 PE bits. The group code identifies an ICPG or unicast group. In this example, group code 000 has been assigned to unicast destinations and group codes 001 to 101 in sequence have been assigned to ICPGs 01, 45, 678, 9AB, and CDE, respectively. The assignment of group codes may be completely arbitrary so long as each ICPG or unicast group receives a unique 3-bit value.

Each destination signature includes, in this example, 3 PE bits that enable specific ports within a group to receive packets sent to the respective destination. Consider, for example, the destination signatures assigned to destinations D1, D2, and D3 which comprise ICPG 01. Port 0 is enabled to receive packets sent to destination D1 (unicast packets to port 0) and destination D3 (multicast packets sent to ports 0 and 1), but not destination D2 (unicast packets to port 1). Similarly, Port 1 is enabled to receive packets sent to destination D2 (unicast packets to port 1) and destination D3 (multicast packets sent to ports 0 and 1), but not destination D1 (unicast packets to port 0). The choice of which of the 3 PE bits enables port 0 and which bit enables port 1 is arbitrary so long as separate bits are used to enable each port.

Note that Port 4 receives packets set to destinations D6 and D7, which is to say that Port 4 receives all packets sent to ICPG 45. Thus a PE bit is not required for Port 4, since port 4 is intended to receive all packets having a group code of 010. Similarly, port A receives all packets sent to ICPG 9AB and thus does not require a PE bit. Also note that ports 7 and 8 both receive packets sent to destinations D9 and D10, but not destination D8. Since ports 7 and 8 always receive the same packets, ports 7 and 8 can "share" a single PE bit.

FIG. 8 shows the port filters for ports 0 to F, which can be directly derived from the destination signatures of FIG. 7A and FIG. 7B. For example, the port filter for port 0 indicates that port 0 is intended to receive packets containing a destination signature with the group code (the three left-hand bits) equal to "001" and the right-hand PE bit equal to "1", which includes packets sent to destinations D1 and D3. Similarly, the port filter for port 3 (which only receives unicast packets in this example) indicates that port 3 is intended to receive packets containing a destination signature equal to "000001".

Each port filter may include a port filter value and a separate port filter mask indicating which bits of the value are not used or "don't care". For example, the port filter value for port 0 may be "001001" and the port filter mask may be "111001", where "1" indicates a designation signature must match the respective bit of the port filter value and "0" indicates that the respective bit of the destination signature is "don't care".

Referring back to FIG. 5, a test signature and test filter may be generated at 560. The test signature may be completely random or may be generated, for example by application of a hash function, based on some initial value. The initial value may be, for example, an input such as a test session name or login name provided by a test engineer or other operator. The length of the test signature may be set such that the combined length of the test signature and any of the destination signatures is equal to a predetermined length. The predetermined length may be, for example, 8 bytes, 12 bytes, 16 bytes, or some other length. The test filter may include the test signature value and a corresponding mask.

At 565, information necessary to conduct the test session may be distributed to port units the will participate in the test session. Information distributed to port units that will generate packets during the test session may include the test signature from 560, the destination signatures from 550, and data defining the streams and flows to be generated from 510. Information distributed to each port unit that will receive packets may include the test filter from 560 and a corresponding port filter from 555. Other information, such as instructions for accumulating performance statistics and for capturing packets may also be distributed to some or all of the port units that will receive packets. When all information necessary to conduct the test session has been distributed, the test session may proceed as shown in FIG. 9.

Figure 9:
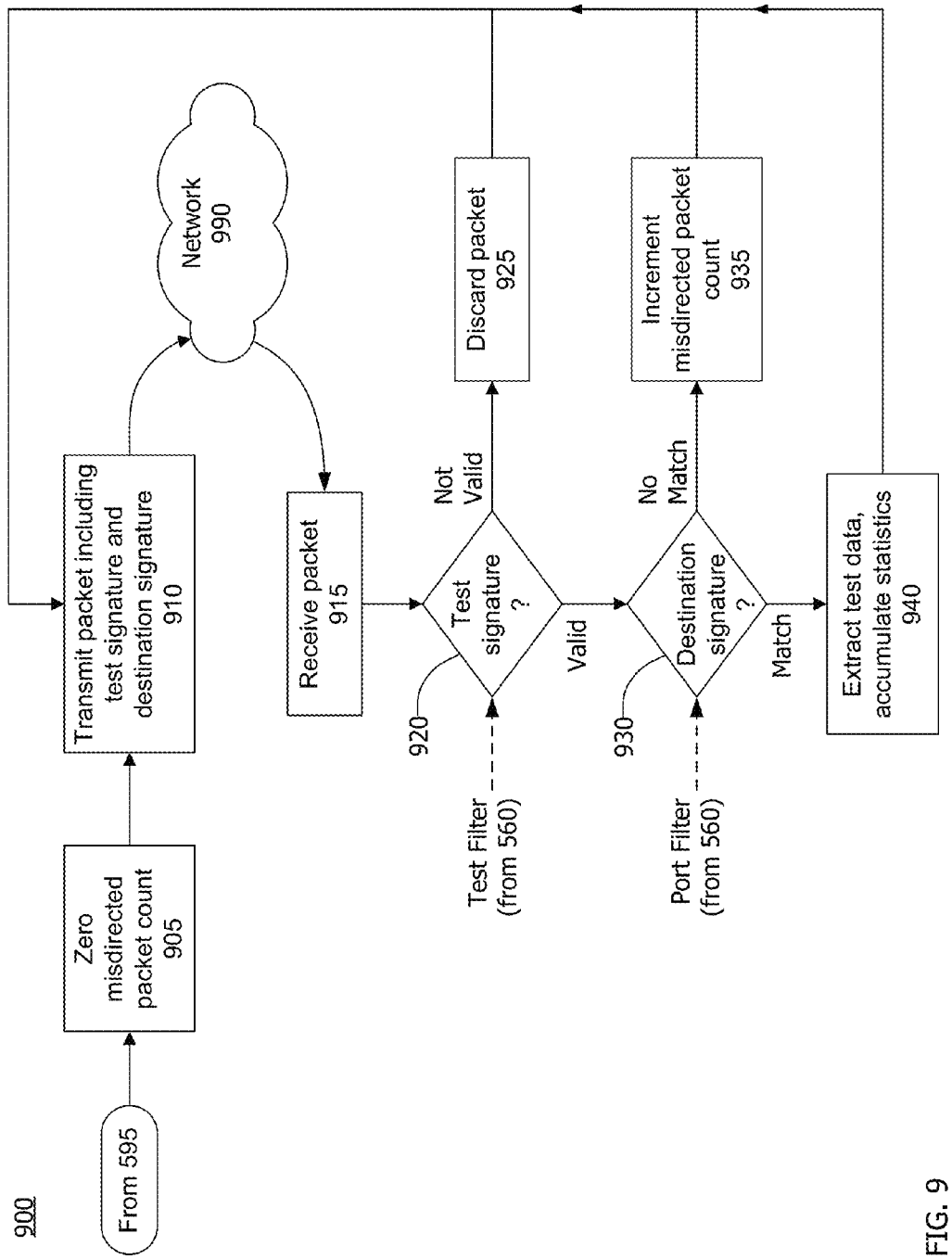
FIG. 9 is a flow chart of a process for testing a network.

Referring now to FIG. 9, a process 900 for testing a network may start after a test session has been designed (as shown in FIG. 5), and may be repeated cyclically for a large number of packets during a network test session. For ease of discussion, the process 900 is shown as a series of sequential steps performed to send a single packet from a traffic generator, such as the traffic generator 228, on a first port unit to a traffic receiver, such as the traffic receiver 440, on a second port unit. However, the process 900 may be performed in a pipelined manner such that multiple packets are in process concurrently. Further, the process 900 may be performed in parallel by multiple port units generating and receiving packets.

At the start of the test session, at 905, a misdirected packet counter at each receiving port unit may be set to zero. At 910, a packet may be generated and transmitted from a transmitting port unit. The packet may include a test signature and a destination signature. The packet may pass through the network under test 990 and may be received at a receiving port unit at 915. In some cases, the packet may be transmitted and received by the same port unit.

At 920, the receiving port unit may determine if the packet contains a valid test signature. The receiving port unit may determine if the packet contains a valid test signature by performing a floating pattern match with a test filter. When the receiving port unit cannot locate a valid test signature within the received packet, the received packet may be discarded at 925. In some cases, the receiving port unit may recognize that a packet without a valid test signature as a control packet and may forward the control packet to a processor (not shown) for additional processing.

When the receiving port unit locates, at 920, a valid test signature within the received packet, the receiving port unit may determine, at 930, if the packet has been received at a correct destination. The receiving port unit may extract a designation signature from the received packet. The receiving port unit may determine that the packet is correctly received if the extracted destination signature matches a port filter. If the destination signature does not match the port filter, the receiving port unit may determine that the received packet has been misdirected. In this case, the misdirected packet counter within the receiving port unit may be incremented at 935.

When the receiving port unit determines, at 930, that a packet has been correctly received, test data may be extracted at 940 and test statistics may be accumulated based on the extract test data.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of testing a network, comprising:
   a source port unit transmitting, via the network, a packet addressed to a multicast group including a plurality of expected destinations, the packet including a destination signature indicative of all of the plurality of expected destinations;
   a receiving port unit receiving the packet, extracting the destination signature from the packet, and comparing the destination signature with a port filter associated with the receiving port unit to determine if the receiving port unit is one of the plurality of expected destinations for the received packet;
   when the receiving port unit is not one of the plurality of expected destinations for the received packet, incrementing a misdirected packet counter;
   when the receiving port unit is one of the plurality of expected destinations for the received packet, extracting test data from the received packet;
   wherein the destination signature is contained in a payload portion of the received packet;
   wherein the destination signature is configured to match all of a plurality of port filters respectively associated with the plurality of expected destinations for the packet and to not match port filters that are not expected destinations for the packet; and
   the port filter is configured to match destination signatures extracted from all packets for which the receiving port unit is an expected destination and to not match destination signatures extracted from packets for which the receiving port unit is not the expected destination.

2. The method of claim 1, further comprising accumulating test statistics based on the extracted test data.

3. A method of testing a network, comprising:
   connecting test equipment including one or more transmitting port units and a plurality of receiving port units to the network;
   defining a plurality of packets to be transmitted from the transmitting port units to the receiving port units via the network, the plurality of packets including multicast packets addressed to a plurality of expected destinations, each of the plurality of packets to include a destination signature indicative of all of the plurality of expected destinations for said each of the plurality of packets;
   transmitting the defined plurality of packets via the network;
   a first port unit of the plurality of receiving port units receiving a first packet addressed to a multicast group including the plurality of expected destinations; and
   comparing the destination signature from the received first packet with a port filter to determine if the first port unit is one of the plurality of expected destinations for the received first packet based on the destination signature;
   when the first port unit is not one of the plurality of expected destinations for the received first packet, incrementing a misdirected packet counter;
   when the first port unit is one of the plurality of expected destinations for the received first packet, extracting test data from the received first packet;

wherein the destination signature is contained in a payload portion of the received first packet;
wherein the destination signature is configured to match all of a plurality of port filters respectively associated with the plurality of expected destinations for the first packet and to not match port filters that are not expected destinations for the first packet; and
the port filter is configured to match destination signatures extracted from all packets for which the first port unit is an expected destination and to not match destination signatures extracted from packets for which the first port unit is not the expected destination.

4. The method of claim 3, further comprising accumulating test statistics based on the extracted test data.

5. The method of claim 3, wherein the defining the plurality of packets further comprises:
assembling a list of destinations and associated intended destination ports for the plurality of packets;
sorting the destinations into a plurality of port groups; and
defining a respective destination signature for each of the destinations.

6. The method of claim 5, wherein the defining the plurality of packets further comprises:
sending at least some of the defined destination signatures to each of the transmitting port units.

7. The method of claim 6, wherein the defining the plurality of packets further comprises:
generating respective port filters for each of the plurality of receiving port units;
sending the respective port filters to each of the plurality of receiving port units.

8. The method of claim 5, wherein the destination signature includes a first portion that identifies a corresponding port group and a second portion that enables specific ports within the port group.

9. The method of claim 8, wherein the plurality of port groups include one or both of unicast port groups and interrelated port groups;
wherein ports within a unicast port group only receive unicast packets, and
each port within an interrelated port group is a member of one or more multicast groups, each of the one or more multicast groups including only ports within the same said interrelated port group.

10. The method of claim 8, further comprising:
disabling misdirected packet detection if a total number of bits required in the destination signature exceeds a predetermined maximum number of bits.

11. A traffic receiver, comprising:
an interface to receive a packet addressed to a multicast group including a plurality of expected destinations, the packet including a destination signature indicative of all of the plurality of expected destinations;
a misdirected packet detector coupled to the interface, the misdirected packet detector further comprising:
a comparator that compares the destination signature extracted from the received packet with a port filter to determine if the traffic receiver is one of a plurality of intended destinations for the received packet;
a counter that increments when the traffic receiver is not one of the plurality of expected destinations for the received packet;
wherein the destination signature is contained in a payload portion of the received packet;
wherein the destination signature is configured to match all of a plurality of port filters respectively associated with the plurality of expected destinations for the packet and to not match port filters that are not expected destinations for the packet; and
the port filter is configured to match destination signatures extracted from all packets for which the traffic receiver is an expected destination and to not match destination signatures extracted from packets for which the traffic receiver is not the expected destination.

12. The traffic receiver of claim 11, further comprising:
a statistics accumulator that, when the traffic receiver is one of the plurality of expected destinations for the received packet, extracts test data from the received packet and accumulates test statistics.

13. A non-transitory machine readable storage medium storing programming code that, when used to program a programmable logic array, configures the programmable logic array to include a traffic receiver comprising:
an interface to receive a packet addressed to a multicast group including a plurality of expected destinations, the packet including a destination signature indicative of all of the plurality of expected destinations;
a misdirected packet detector, further comprising:
a comparator that compares the destination signature extracted from the received packet with a port filter to determine if the traffic receiver is one of a plurality of intended destinations for the received packet, wherein the received packet is addressed to the multicast group;
a counter that increments when the traffic receiver is not one of the plurality of expected destinations for the received packet;
wherein the destination signature is contained in a payload portion of the received packet;
wherein the destination signature is configured to match all of a plurality of port filters respectively associated with the plurality of expected destinations for the received packet and to not match port filters that are not expected destinations for the received packet; and
the port filter is configured to match destination signatures extracted from all packets for which the traffic receiver is an expected destination and to not match destination signatures extracted from packets for which the traffic receiver is not the expected destination.

14. The non-transitory machine readable storage medium of claim 13, the traffic receiver further comprising:
a statistics accumulator that, when the traffic receiver is one of the plurality of expected destinations for the received packet, extracts test data from the received packet and accumulates test statistics.

15. A method of testing a network, comprising:
a first port unit receiving, via the network, a packet addressed to a multicast group including a plurality of expected destinations;
the first port unit extracting a destination signature from the packet, the destination signature indicative of all of the plurality of expected destinations for the packet;
the first port unit comparing the destination signature and a first port filter uniquely associated with the first port unit to determine if the first port unit is one of the plurality of expected destinations for the packet;
when the first port unit is not one of the plurality of expected destinations for the packet, incrementing a first misdirected packet counter;
a second port unit receiving, via the network, the packet;
the second port unit extracting the destination signature from the packet the second port unit comparing the destination signature and a second port filter uniquely associated with the second port unit to determine if the second port unit is another of the plurality of expected destinations for the packet;

when the second port unit is not another of the plurality of expected destinations for the packet, incrementing a second misdirected packet counter;

wherein the destination signature is contained in a payload portion of the packet;

wherein the destination signature is configured to match all of a plurality of port filters respectively associated with the plurality of expected destinations for the packet and to not match port filters that are not expected destinations for the packet; and the first port filter is configured to match destination signatures extracted from all packets for which the first port unit is an expected destination and to not match destination signatures extracted from packets for which the first port unit is not the expected destination.

* * * * *